June 30, 1964

J. A. BALDREY

METHOD OF MAKING A SILICON ARTICLE BY USE OF A REMOVABLE CORE OF TANTALUM 3,139,363

Filed Nov. 4, 1960

2 Sheets-Sheet 1

John Arthur Baldrey
INVENTOR

United States Patent Office 3,139,363

Patented June 30, 1964

3,139,363

METHOD OF MAKING A SILICON ARTICLE BY USE OF A REMOVABLE CORE OF TANTALUM

John Arthur Baldrey, Bedford, England, assignor to Texas Instruments Incorporated, Dallas, Tex., a corporation of Delaware Filed Nov. 4, 1960, Ser. No. 66,926
Claims priority, application Great Britain Jan. 4, 1960
10 Claims. (Cl. 156—3)

This invention relates to the deposition of silicon on a tantalum article and from which a silicon article thereby produced subsequently is to be removed.

Such silicon articles may be produced by heating a tantalum article and exposing this latter article to an atmosphere containing gaseous silicon compounds from which silicon is deposited on the tantalum article or core. It has been found that the deposited silicon adheres strongly to the tantalum article and this adhesion combined with the effects of the difference between the coefficients of expansion of tantalum and silicon results in cracking of the deposited silicon during cooling.

It is an object of the present invention to reduce such adhesion between a tantalum article or core and silicon deposited thereon.

Figure 1:
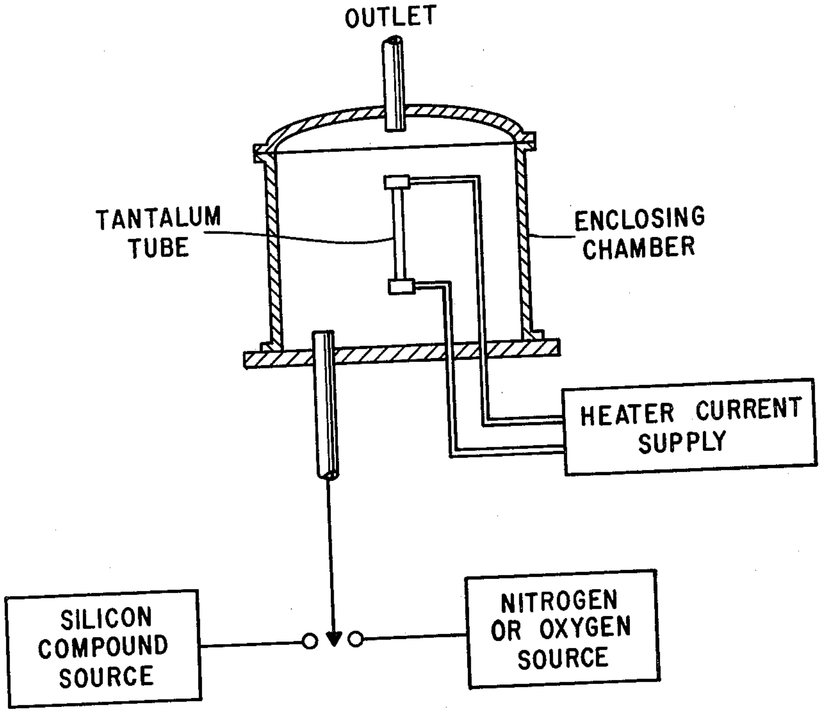
Figure 2:
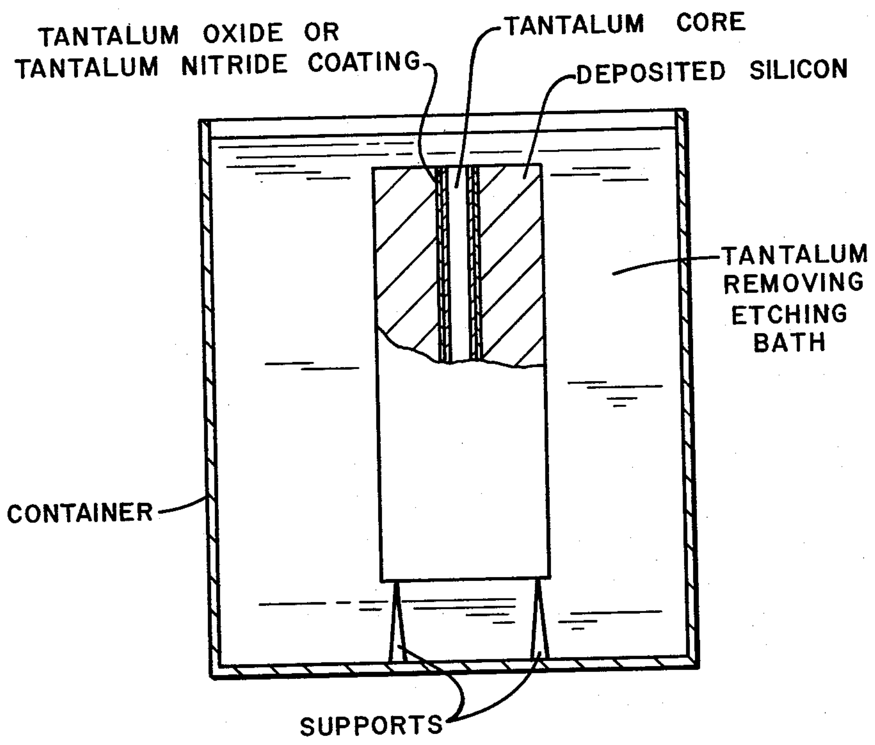

FIGURES 1 and 2 of the drawing portray the process diagrammatically.

According to the present invention, a process for the deposition of silicon on a tantalum article or core comprises the steps of heating the tantalum article upon which silicon is to be deposited in a nitrogen or oxygen-containing atmosphere to a temperature and for a period sufficient for a layer of tantalum nitride or tantalum oxide respectively to be formed over the surface on which silicon is to be deposited, and then exposing said surface to an atmosphere containing a gaseous silicon compound, said compound consisting of silane, a halogen derivative of silane, or a mixture thereof, and maintaining the article at a temperature at which silicon deposits on the article.

The formation of a nitride or oxide layer on the tantalum article prior to deposition of silicon has been found to reduce the adhesion between the article and the deposited silicon, thereby decreasing the possibility of cracking the silicon due to the difference in coefficients of expansion of silicon and tantalum.

Advantageously, the gaseous silicon compound may be silane, trichlorosilane, silicon tetrachloride or silicon tetraiodide; alternatively, monochlorosilane or dichlorosilane may be used.

During deposition of silicon, the tantalum article is maintained at a temperature within the range 800° C.–900° C. when the gaseous silicon compound used is silane, in the range 1000° C.–1200° C. when trichlorosilane is used, and in the range 1200° C.–1300° C. when silicon tetrachloride is used.

Suitable nitridnig atmospheres are nitrogen, a mixture of nitrogen and hydrogen, or ammonia gas, and in such atmospheres the tantalum article may be heated to a temperature within the range 900° C. to 3000° C. for a minimum period of sixty minutes at the lower temperature, decreasing to a few seconds at the higher temperature. If desired, these periods may be increased above the minimum periods.

Conveniently, the tantalum article may be heated to a temperature of 1100° C., exposed to a nitriding atmosphere for a period of ten minutes, and maintained at this temperature during deposition of silicon from an atmosphere consisting of a mixture of hydrogen and trichlorosilane.

Suitable oxidizing atmospheres are oxygen, air or a mixture of oxygen and an inert gas, and the tantalum article may be heated in such an atmosphere to a temperature within the range 700° C. to 3000° C. for a minimum period of sixty minutes at the lower temperature, decreasing to a few seconds at the higher temperature.

In a particular embodiment of the invention, the tantalum article may be a tube of small diameter on which silicon is deposited to form a silicon rod.

In carrying out a process according to the invention, the tantalum article is supported within an enclosing chamber in such manner that the area over which silicon is to be deposited is exposed to the nitriding atmosphere. The article may be supported by any suitable means made of a material capable of withstanding the temperature at which the surface of the tantalum article is nitrided or oxidized in the nitriding or oxidizing atmosphere. A material suitable for a support up to a temperature of 1250° C. is quartz, while above that temperature refractory metals, such as tungsten, molybdenum or tantalum, or suitable noble metals, such as platinum or rhodium, can be used.

The process of the present invention is illustrated diagrammatically in FIGURES 1 and 2 of the drawing. For convenience legends have been applied to the drawing thereby making its portrayal self-evident.

By way of example only, a process embodying the invention will be described in greater detail.

This process relates to the production of silicon rods by deposition of silicon on a tantalum tube. The silicon rods thereby produced are of convenient shape and suitable purity for further treatment by the so-called "zone refining" method.

A tantalum tube having an external diameter of 0.1 inch and of required length is supported vertically within an enclosing chamber, between two tungsten chucks in such manner as to leave the external surface of the tube, on which silicon is to be deposited, exposed. An electric current is passed through the tube sufficient to raise the temperature of the latter to, and maintain it at, 1100° C.

A stream of nitrogen is then passed through the chamber and over the exposed surface of the tantalum tube for a period of ten minutes. This period is sufficient to form the required layer of tantalum nitride over the exterior surface of the tube, but may be increased if so desired.

After this period, the stream of nitrogen is gradually shut off and replaced by a stream of mixed hydrogen and trichlorosilane, the total gas flow being maintained constant. The temperature of the tantalum tube is maintained at 1100° C. during flow of the mixture of hydrogen and trichlorosilane.

In order to build up a rod of uniform diameter along its length, it has been found desirable to reverse the flow of the hydrogen and trichlorosilane mixture so that the mixture flows along the length of the tube in both directions for equal periods.

When sufficient silicon has been deposited to form a rod of the required diameter, the flow of gas is turned off, the current supply cut off immediately, and the tube and deposited rod allowed to cool to room temperature. If desired, the current may be reduced gradually and the cooling period thereby extended.

When the tube and rod are sufficiently cooled, they are stood vertically in a bath of hydrofluoric acid which dissolves the tantalum, leaving a cylindrical silicon rod having a central bore. The step of removing the tantalum core comprising a tantalum removing etching step is schematically portrayed in FIGURE 2 of the drawing.

Alternatively, the tantalum tube may be removed by vapor-phase etching, i.e., by blowing hydrogen fluoride (HF) or fluorine through the central hole, thereby removing the tantalum as tantalum fluoride ($TaF_5$). Such a method of removal, however, also etches away silicon.

If instead of a nitriding atmosphere an oxidizing atmosphere is used, it is important that all traces of gaseous oxygen be removed from the chamber before admission into the chamber of the silicon-depositing atmosphere. Apart from this consideration, the process can be carried out in the same manner as that described above with respect to a nitriding atmosphere.

In either case, the tantalum tube may be heated by means other than by passing an electric current through it, for example, by an external furnace.

The nitriding or oxidizing atmosphere may be flowing or static. In the latter case, sufficient nitrogen or oxygen must be present to form the required coating of tantalum nitride or tantalum oxide, as it is consumed during the process.

The above-described process may be employed for the production of silicon articles other than rods by depositing silicon on an appropriately shaped tantalum article. An example of such articles is a silicon radome, which is used as a cover for a radar antenna on an aircraft.

What is claimed is:

1. A method for producing a shaped silicon body of desired purity comprising the steps of placing a tantalum core member in a reaction chamber having therein a reactive atmosphere including an element selected from the group consisting of nitrogen and oxygen, heating the tantalum core to form a surface layer on the core selected from the group consisting of tantalum nitride and tantalum oxide; thereafter passing a stream of gaseous silicon compound through the reaction chamber to cause a layer of silicon to deposit onto said surface layer of said tantalum core from the gaseous phase to thereby reduce the adhesion between the deposited silicon and tantalum core member from that adhesion which would otherwise result by depositing the silicon directly onto said tantalum core member in the absence of said surface layer, and thereafter the step of removing said tantalum core from the deposited silicon comprising a tantalum removing etching step to leave a shaped silicon body of desired purity.

2. The method as defined in claim 1 wherein said reactive atmosphere comprises nitrogen and said tantalum core is heated to a temperature of from 900° C. to 3000° C.

3. The method defined in claim 1 wherein said reactive atmosphere comprises oxygen and said tantalum core is maintained at a temperature of from 700° C. to 3000° C.

4. A method for making a shaped silicon article of desired purity which comprises forming a tantalum member into a complementary shape, heating said tantalum member in a nitrogen containing atmosphere to form a layer of tantalum nitride on the surface of said tantalum member, thereafter depositing a relatively uniform layer of silicon on said layer of tantalum nitride to thereby reduce the adhesion between the deposited silicon and the tantalum member from the adhesion which would otherwise result by depositing the silicon directly onto said tantalum member in the absence of said tantalum nitride layer; and thereafter the step of removing said tantalum member from the deposited silicon comprising a tantalum removing etching step to leave a shaped silicon article of desired purity.

5. A method for making shaped silicon articles as defined in claim 4 wherein said tantalum member is heated to a temperature of from 900° C. to 3000° C.

6. The method for producing a shaped high purity silicon body which comprises supporting a tantalum tube within a reaction chamber, passing a stream of reactive gas containing an element selected from the group consisting of nitrogen and oxygen into said reaction chamber while maintaining said tantalum tube at a temperature sufficient to cause a layer selected respectively from the group consisting of tantalum nitride and tantalum oxide to be formed on the surface of said tube, thereafter passing a stream of gaseous silicon compound through the reaction chamber while maintaining said tantalum at a temperature sufficient to cause silicon to deposit onto said surface layer on said tube from the gaseous phase to thereby reduce the adhesion between the deposited silicon and tantalum over that which would otherwise result by depositing the silicon directly on the tantalum tube in the absence of said surface layer, and thereafter the step of removing the tantalum tube from the deposited silicon comprising a tantalum removing etching step to leave a shaped high purity silicon body.

7. The method for producing a shaped high purity silicon body which comprises supporting a tantalum tube within a reaction chamber, passing a stream of nitrogen through said reaction chamber while maintaining said tantalum tube at a sufficiently high temperature to cause a layer of tantalum nitride to be formed on the surface of said tube, passing a stream of hydrogen and trichlorosilane through said reaction chamber while maintaining said tantalum tube at a temperature to cause silicon to deposit onto said tube overlying said layer of tantalum nitride from the gaseous phase, and thereafter the step of removing said tantalum tube from the deposited silicon comprising a tantalum removing etching step to leave a shaped high purity silicon body.

8. A method for producing high purity silicon as defined in claim 7 wherein said tantalum tube is maintained at a temperature of approximately 1100° C. by passing electric current through said tube.

9. A method for producing high purity silicon as defined in claim 7 wherein said stream of hydrogen and trichlorosilane is caused to flow in one direction for a period of time and thereafter said stream of hydrogen and trichlorosilane is caused to flow in an opposite direction for approximately an equal period of time.

10. The method for producing a shaped high purity silicon body which comprises supporting a cylindrical tantalum core within a reaction chamber, passing a stream of nitrogen through said reaction chamber while maintaining said tantalum core at a sufficiently high temperature to cause a layer of tantalum nitride to be formed on the surface of said core, passing a stream of hydrogen and trichlorosilane through said reaction chamber while maintaining said tantalum core at a temperature to cause silicon to deposit onto said core from the gaseous phase, and thereafter the step of removing said tantalum core from the deposited silicon comprising placing said silicon and tantalum core in a bath of hydrofluoric acid to leave a shaped high purity silicon body.

References Cited in the file of this patent

UNITED STATES PATENTS

| | | |
|---|---|---|
| 589,415 | De Chalmot | Sept. 7, 1897 |
| 2,873,208 | Charlton et al. | Feb. 10, 1959 |
| 2,893,850 | Von Bichowsky | July 7, 1959 |
| 2,904,452 | Reichelt | Sept. 15, 1959 |
| 2,938,772 | Enk et al. | May 31, 1960 |
| 2,967,115 | Herrick | Jan. 3, 1961 |
| 2,992,080 | Herrick | July 11, 1961 |
| 3,004,835 | Verner et al. | Oct. 17, 1961 |

OTHER REFERENCES

Chem. Eng., August 1937, pages 165, 166.